United States Patent [19]

Takase

[11] Patent Number: 4,813,058
[45] Date of Patent: Mar. 14, 1989

[54] FSK SIGNAL DEMODULATOR

[75] Inventor: Akihiko Takase, Tokyo, Japan

[73] Assignee: Hitachi, Ltd., Tokyo, Japan

[21] Appl. No.: 84,900

[22] Filed: Aug. 13, 1987

[30] Foreign Application Priority Data

Sep. 1, 1986 [JP] Japan .................................. 61-203655

[51] Int. Cl.⁴ .............................................. H03D 3/00
[52] U.S. Cl. ........................................ 375/82; 329/104;
329/126
[58] Field of Search ............... 329/104, 105, 110, 122,
329/126; 375/80, 82, 88; 455/208, 214

[56] References Cited

U.S. PATENT DOCUMENTS

| 3,670,249 | 6/1972 | Meslener | 375/82 |
| 4,616,187 | 10/1986 | Watanabe | 329/126 |
| 4,656,431 | 4/1987 | Chapman | 329/126 |
| 4,723,288 | 2/1988 | Borth et al. | 329/126 |

Primary Examiner—Benedict V. Safourek
Attorney, Agent, or Firm—Antonelli, Terry & Wands

[57] ABSTRACT

An FSK signal demodulator for demodulating digital data from a frequency shift keying signal. A timing clock for the digital data is extracted from the FSK signal, and a sampling circuit samples the FSK signal by means of a clock having a frequency which is almost equal to one frequency of the FSK signal or which is almost equal to an integral multiple of that fequency.

5 Claims, 9 Drawing Sheets

FIG. 5
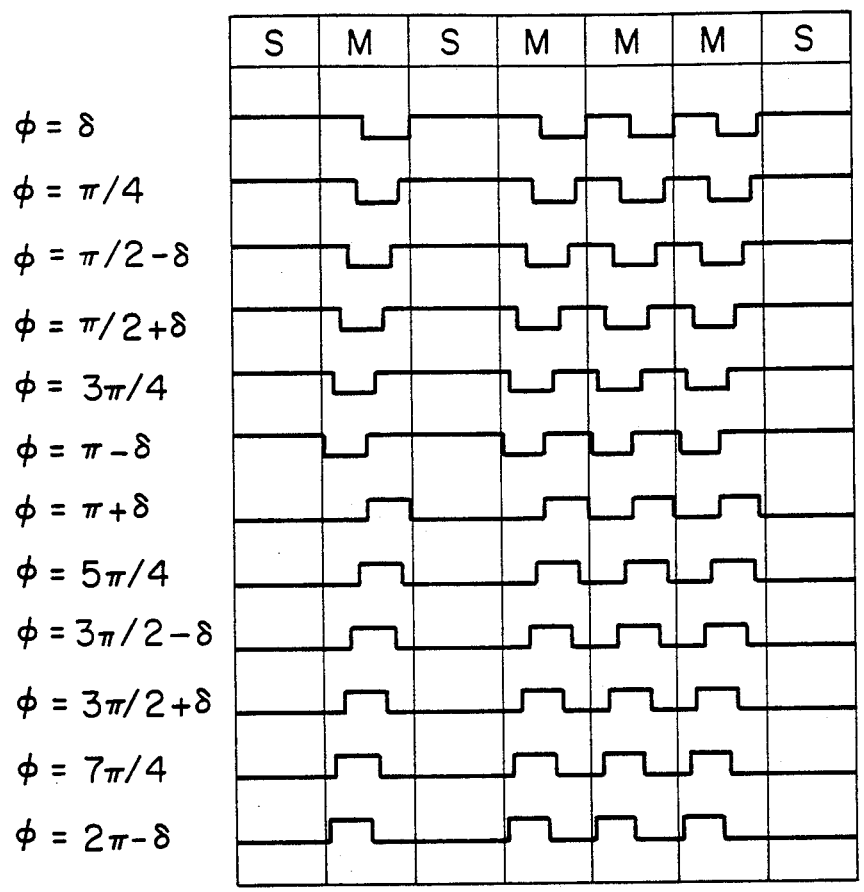
φ : SELF-RUNNING CLOCK PHASE
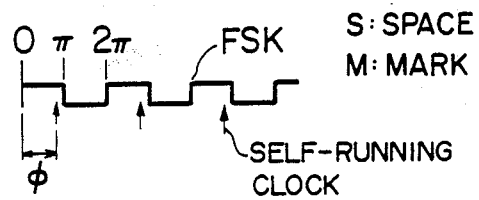
S : SPACE
M : MARK

FSK SIGNAL DEMODULATOR

BACKGROUND OF THE INVENTION

The present invention relates to a demodulator to demodulate a data signal from an FSK (Frequency Shift Keying) signal in a transmission system for and, more particularly, to an FSK signal demodulator suitable in the form of a digital integrated circuit.

Such a kind of technique is disclosed in, for example, "Analog and Communications Products Data Book", pp. 9.22 to 9.42, Advanced Micro Devices, Inc., 1983.

In addition, an apparatus in the form of a digital integrated circuit FSK signal demodulating apparatus is disclosed in JP-A-54-87465. FIG. 2 herein shows main sections of this prior art apparatus and FIG. 3 shows a waveform in each section. A data signal such as shown at waveform 3a in FIG. 3 is modulated with FSK modulation, and the resulting signal is converted into pulse train such as a waveform 2a in FIG. 3 by a band pass filter 1 and a slicer 2. This pulse train is converted into a pulse train of a constant pulse width such as waveform 2b by a pulse width adjusting circuit 21. This pulse train is as a reset pulse to a counter 22. A pulse train waveform 2c, having a sufficiently higher-speed than the waveform 2b, is input from an oscillator 23 to a clock input of the counter 22. In FIG. 3, waveform 3b denotes the operation of the counter 22. This diagram shows a change in count number as an axis of ordinate. It is determined by a decision circuit 24 whether the counter output is "1" or "0" using as a reference value the count level indicated by the alternate long and short dash line in waveform 3b of FIG. 3. The resultant data becomes a waveform as shown in waveform 2d. This signal is filtered by a low pass filter 25 to eliminate the influence of noise, so that a signal of waveform 2e is derived. This signal is waveform shaped by a waveform reshaper 26 to thereby form a pulse. A data signal clock output 2g is extracted by a timing detection circuit 28. A data signal output such as a waveform 2f is obtained by a regenerator 27.

The demodulating accuracy of the foregoing demodulator is detected by the ratio of the carrier frequency of the FSK signal and the frequency of the counter clock (waveform 2c in FIG. 3) from the oscillator 23. As the counter clock frequency is higher than the FSK carrier frequency, the allowance for the discriminating count number is large as shown in FIG. 3b in FIG. 3. The allowance for noise is large, and the demodulation can be performed with a high demodulating accuracy. However, when considering the semiconductor device and circuit technique which are used, the counter clock frequency cannot be set to a high value without limitation. When the counter clock frequency is set to about 10 MHz, the carrier frequency is at most about 100 kHz and the transmission data signal speed is about a few kb/sec. It is impractical to transmit a data signal of a speed higher than that value by the transmission system using the foregoing demodulator.

Further, the conventional apparatus needs averaging with the low pass filter 25 and has a drawback such that the whole demodulator cannot be formed of only logic circuits.

SUMMARY OF THE INVENTION

It is an object of the present invention to provide an FSK signal demodulator which can demodulate a data signal with a signal having a frequency that is almost equal to the carrier frequency and which can be formed of only logic circuits.

To accomplish the above object, the present invention is constituted in the following manner.

The FSK signal, which was converted into a pulse by a band pass filter and a slicer, is sampled by a sampling circuit controlled by a clock whose frequency is nearly equal to an integral multiple of either the mark frequency or the space frequency of the FSK signal. Thus, the FSK signal is converted into a frequency which is substantially the same as that of the data signal. Since this signal is a low-speed signal, it can be demodulated by signal processing at a speed near the carrier frequency. This frequency converted FSK signal is converted to a binary signal by a frequency decision circuit on the basis of the digital counting system, thereby demodulating the data signal. A data signal clock timing signal which is needed at this time is extracted from the FSK signal by a data clock detection circuit.

According to the present invention, there is no need to use a clock of a frequency which is ten or more times as high as the FSK signal carrier frequency, as in the conventional apparatus. The demodulation can be performed by merely using a clock of a frequency which is nearly equal to the FSK signal carrier frequency.

In addition, since the whole demodulator can be formed of logic circuits and can operate without adjustment, a digital integrated circuit of gate arrays or the like can be provided. Thus, the number of components is reduced and there is no need for adjustments, so that the cost can be considerably reduced.

BRIEF DESCRIPTION OF THE DRAWINGS

FIG. 5 is an explanatory diagram of a level inverting position;

DESCRIPTION OF THE PREFERRED EMBODIMENTS

Figure 1:
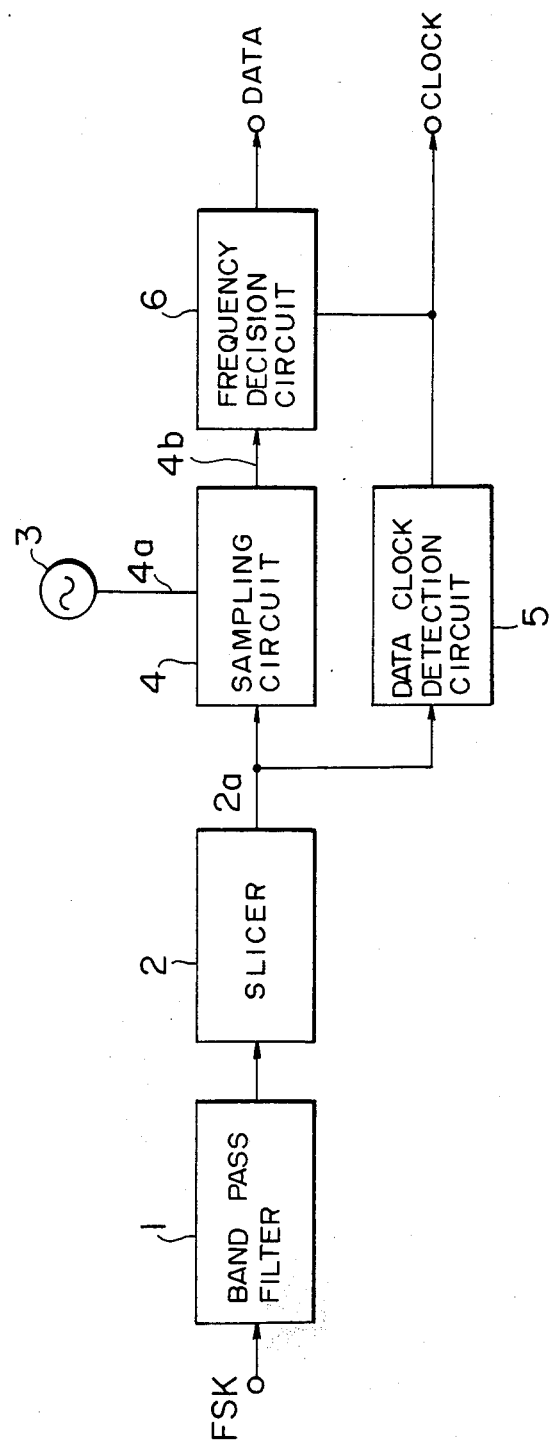
FIG. 1 is a block diagram showing an example of an implementation of the present invention.
Figure 2:
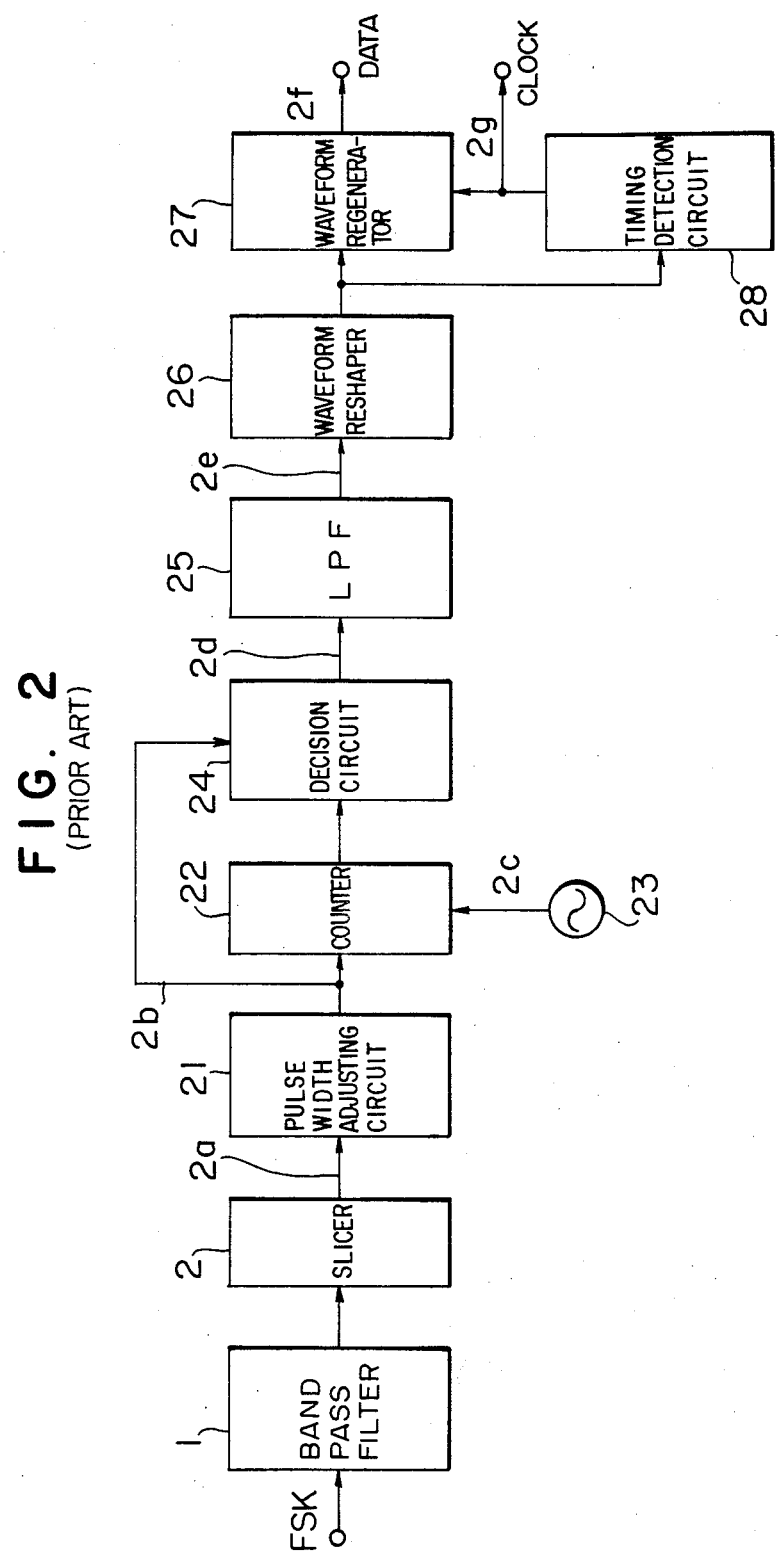
FIG. 2 is a block diagram showing a constitution of a conventional FSK demodulator.
Figure 3:
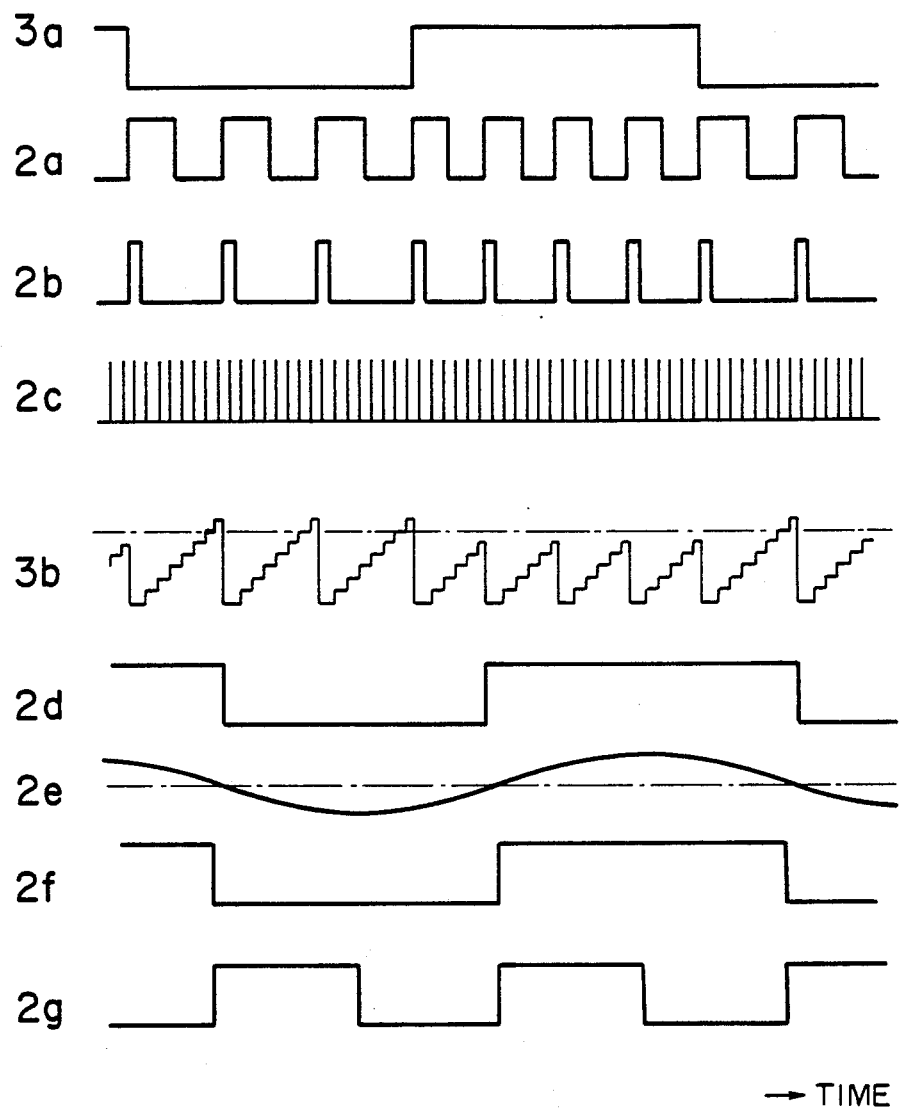
FIG. 3 is a waveform diagram for components in FIG. 2.

FIG. 1 shows an embodiment of the present invention. In the diagram, the FSK signal is converted into a pulse train by the band pass filter 1 and slicer 2 and becomes the signal 2a. The oscillator 3 generates a clock signal 4a having a frequency which is nearly equal to a frequency which is an integral multiple (one in this example) of either the mark frequency or the space frequency of the signal 2a. A sampling circuit 4 samples the signal 2a at the clock signal 4a. Thus, the FSK signal is converted into a signal 4b having a frequency which is almost the same as that of the data signal. Since the signal 4b is a low-speed signal, demodulation can be performed at a speed which is nearly equal to the carrier frequency. This frequency converted FSK signal 4b is converted to a binary signal by a frequency decision circuit 6 on the basis of the digital counting system, thereby demodulating the data signal. A data signal clock timing signal which is needed at this time is extracted from the FSK signal by a data clock detection circuit 5.

Figure 4A:
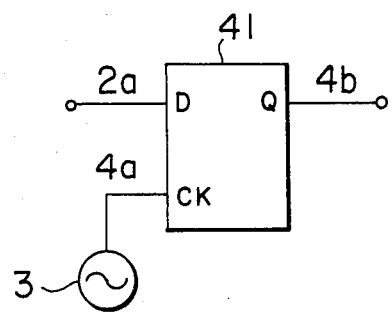
FIGS. 4A and 4B are a schematic diagram and a waveform diagram of a sampling circuit for use in FIG. 1.
Figure 4B:
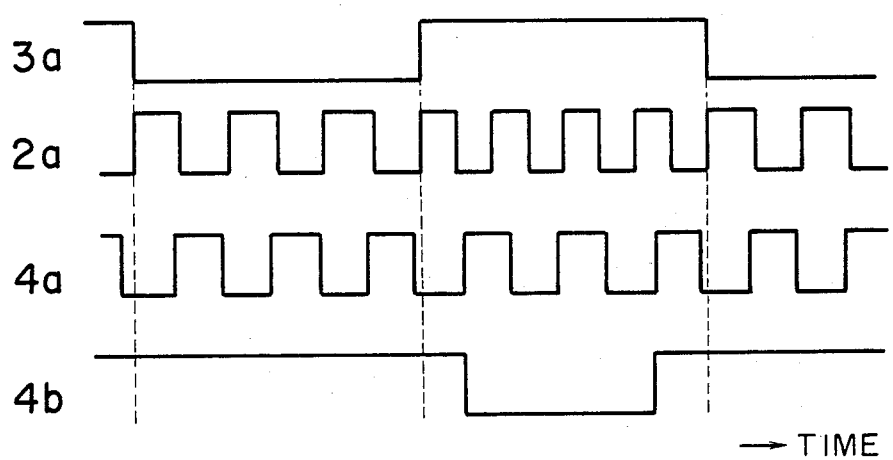

FIG. 4A shows an example of an implementation of the sampling circuit 4 using a D flip-flop. FIG. 4B shows waveforms of each section in FIG. 4A and of corresponding points in FIG. 1. The FSK signal 3a is shaped by the band pass filter 1 and slicer 2 to provide waveform 2a which is applied to the D input terminal of a flip-flop 41. The sampling clock 4a, having a frequency which is nearly equal to the frequency assigned to a space signal of the FSK signal, is connected to a Ck input terminal of the flip-flop 41. Thus, the signal 4b is provided as the output from flip-flop 41. Signal 4b is divided into a DC component portion whose level does not change and an AC component portion whose level changes in one time slot in correspondence to the signal 3a. Since the level of the AC component is inverted twice for one time slot, its frequency is equal to the data signal speed. In this manner, the FSK signal is frequency converted into a DC component and an AC component.

The position at which the level is inverted as shown in the signal 4b in FIG. 4 differs in dependence on the phase difference between the oscillation signal 4a from the oscillator 3 and the FSK signal. This point will be explained with reference to FIG. 5. In the diagram of FIG. 5, $\phi$ denotes a phase difference between the FSK space signal frequency and the sampling clock. As will be obvious from the diagram, the level inverted signal occurs in the mark signal interval irrespective of the phase of $\phi$. Namely, on the basis of whether the level has been inverted in the time slot of the data signal or not, it is possible to discriminate whether the time slot corresponds to a mark M or a space S. In this discrimination, it is sufficient to discriminate between the DC component and the AC component. Therefore, a discriminating clock of a speed higher than that of the data signal is counted by a counter such as to perform the counting operation only when the output of the flip-flop 41 is at the "H" level. If the count number is 0 or n (n is the number of discriminating clock pulses which are generated in the time slot of the data signal), it is decided that the time slot indicates a space. If the count number is n/2, it is determined that the time slot represents a mark. Thus, a discrimination allowance of n/2 is obtained. In this case, even when n is set to a large value above 10, the discriminating clock has a frequency which is almost equal to the carrier frequency. A high-speed clock, as in the conventional apparatus, is unnecessary. Further, a clock in the form of the oscillator 3 for frequency conversion can be also used.

The time slot corresponding to the data signal is detected and the timing to reset the discriminating counter is extracted in the following manner. As will be understood from FIG. 5, the level inverted signal does not overflow from this time slot. Namely, by adjusting the position of the time slot such that the level inverted signal does not overflow, the accurate counter reset timing (data signal clock) can be extracted.

In the foregoing demodulating method, when $\phi=0$, $\pi$, and $2\pi$, there is a possibility that a level inverted signal is output for the space interval. This state corresponds to the case where a jitter due to the noises occurring in the FSK input to the D flip-flop. In this case, there is a possibility that an error exceeding the discrimination allowance of the discriminating counter may occur. To prevent this error, it is sufficient to perform the discrimination by two phases by use of clocks whose phases differ by $\pi/2$. When the phase $\phi$ of one clock is equal to 0, $\pi$, and $2\pi$, the phase $\phi$ of the other clock is $\pi/2$ and $3/2\pi$, so that accurate discrimination can be performed. Moreover, since the foregoing error occurs in only the space interval, the accurate demodulation can be performed by merely calculating the AND of the results of the discrimination of two phases.

In the case of the data signal clock extracted by the foregoing method, if jitter is large, this jitter can be reduced in the following manner. In the case of the phase continuous FSK signal, the phases of two frequencies which are key-input coincide at the timing of the data signal clock, i.e., the frequency switching timing. Therefore, after this coincident point has been detected by the foregoing method, by locking the data signal timing clock at the coincident point in a PLL manner, the jitter can be reduced to a value which is determined by the characteristics of the PLL even if the phase of the level inverted signal in the mark interval fluctuated due to frequency deviation.

Figure 6:
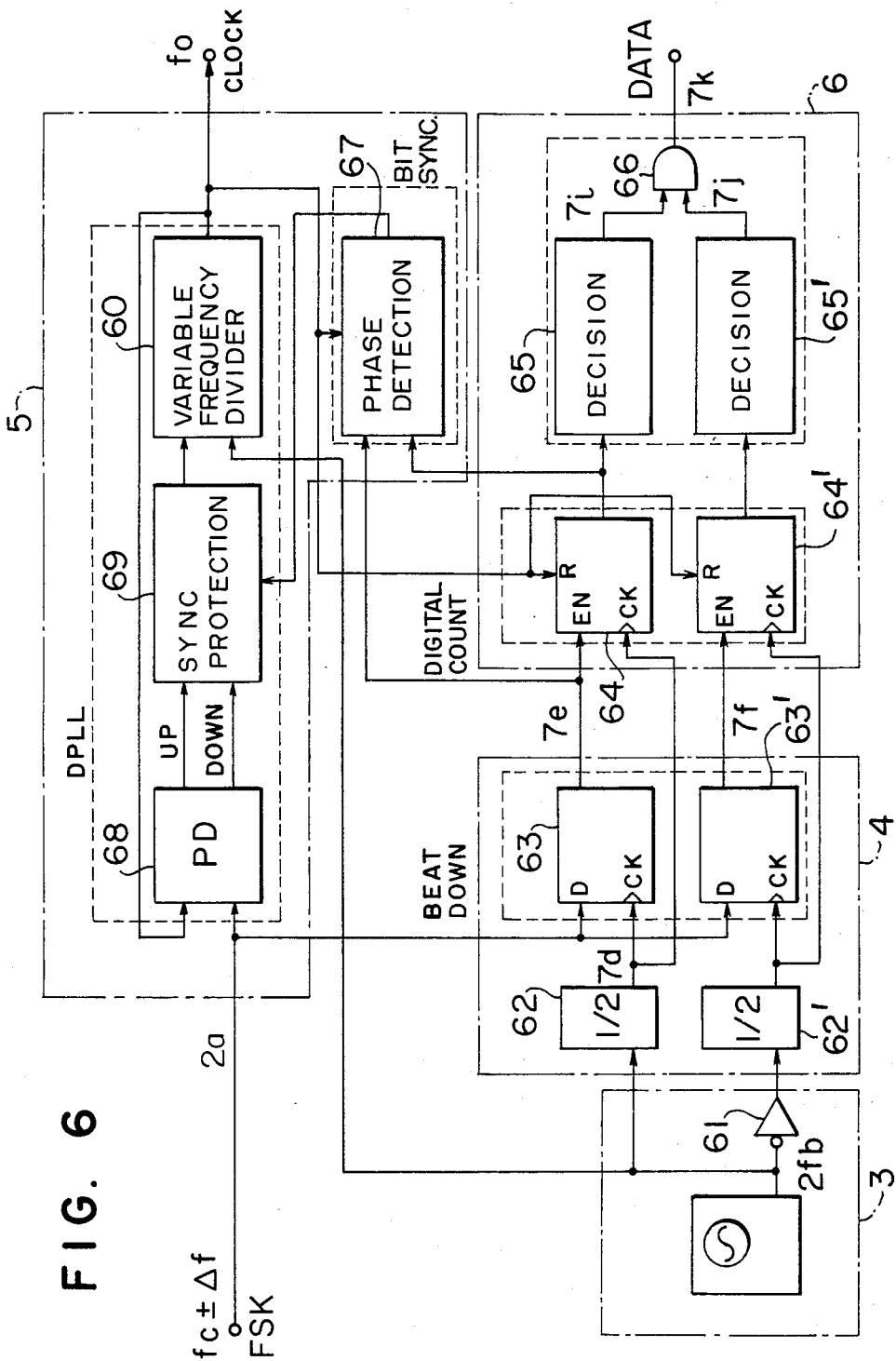
FIG. 6 is a block diagram showing an embodiment of the invention.
Figure 7:
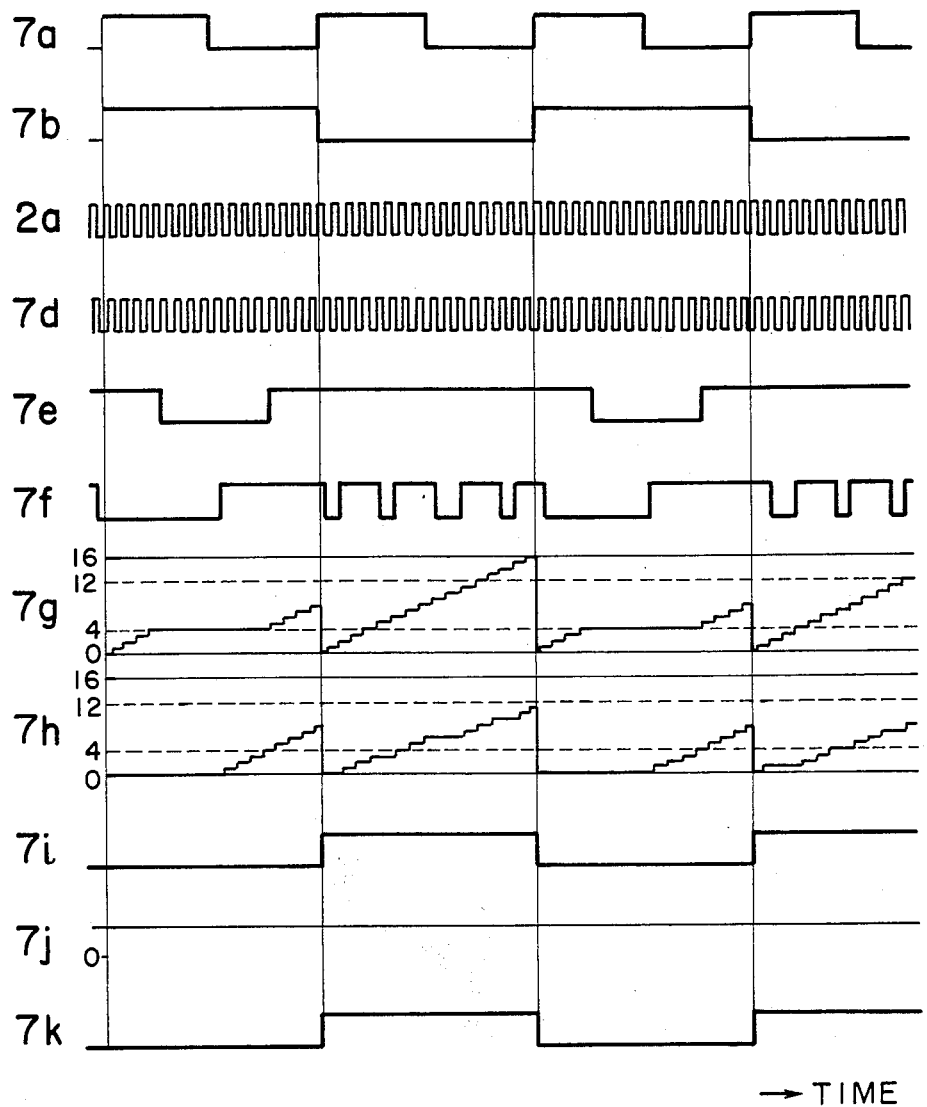
FIG. 7 is a waveform diagram for components in FIG. 6.

FIG. 6 shows a practical embodiment of the invention. FIG. 7 shows waveforms for components in FIG. 6. An explanation will now be made with respect to the example in which the data clock frequency is set to $f_0$, the "mark" of the data signal is set to $17f_0$ ($=f_c+\Delta f$), and the "space" of the data signal is set to $16f_0$ ($=f_c-\Delta f$). In FIG. 7, waveform 7a indicates the data clock and waveform 7b represents the transmission data signal.

The waveform of the received FSK signal is shaped as shown by waveform 7c by the band pass filter 1 and slicer 2. On the other hand, the oscillator 3 on the reception side provides a clock of the frequency $2f_b[2(f_c-\Delta f)]$ which is almost twice as high as the frequency corresponding to the "space" signal. One of the clock signals is converted into a sampling clock 7d of a frequency $f_b$ by a ½ frequency divider 62. The other signal is converted into a signal having the opposite phase by an inverter 61, and thereafter it is frequency divided by ½ by a frequency divider 62'. Thus, the signal is converted into the sampling clock whose phase differs by $\pi/2$ from the phase of the sampling clock 7d. Further, another signal is input to a DPLL (digital phase locked loop) consisting of a phase comparator 68, a synchronizing protection circuit 69, and a variable frequency divider 60. The sampling clock signal 7d and the inverted sampling clock signal are applied to the clock terminals of flip-flops 63 and 63' respectively. The FSK signal is applied to the D input terminals of the flip-flops 63 and 63'. Thus, the signals having waveforms 7e and 7f, derived by frequency converting the FSK signal 7c, are output from the flip-flops 63 and 63', respectively. When it is assumed that hexadecimal counters 64 and 64' count the foregoing sampling clocks of two phases only when the outputs of the flip-flops 63 and 63' are at the "H" level, the count numbers of the counters 64 and 64' become as diagrammatically shown in 7g and 7h. In this case, the count values 7g and 7h are discriminated as shown in 7i and 7j by use of decision circuits 65 and 65' such as to decide the "mark" when the count value lies within a range of 4 to 12 and the "space" when the count value falls within a range of 0 to 4 or 12 to 16, respectively. However, since the phase difference between the clock and the FSK signal is about 0 or $\pi$ in the case of the waveform 7f, the erroneous frequency conversion is performed in the "space" interval. Therefore, the result 7j of the discrimination differs from the transmission data 7d. However, a data signal 7k without an error is obtained by an AND circuit 66.

On the other hand, the data clock is reproduced in the following manner. As shown in FIG. 5, if the frequency $f_b$ of the sampling clock is slightly deviated from one frequency $f_c - \Delta f$ of the FSK signal, the outputs of the flip-flops 64 and 64' change in accordance with this deviation. For example, when $f_b$ is slightly higher than $f_c - \Delta f$, the waveforms change upwardly from the lower portion in FIG. 5. When the phase $\phi$ is near $\pi$, the signal corresponding to the "space" interval changes from the "L" level to the "H" level. At this time, the trailing edge of the signal corresponding to the "mark" coincides with the frequency switching timing of the FSK signal. A phase detecting circuit 67 operates as mentioned above and controls the synchronizing protection circuit 69 in the DPLL.

Figure 8:
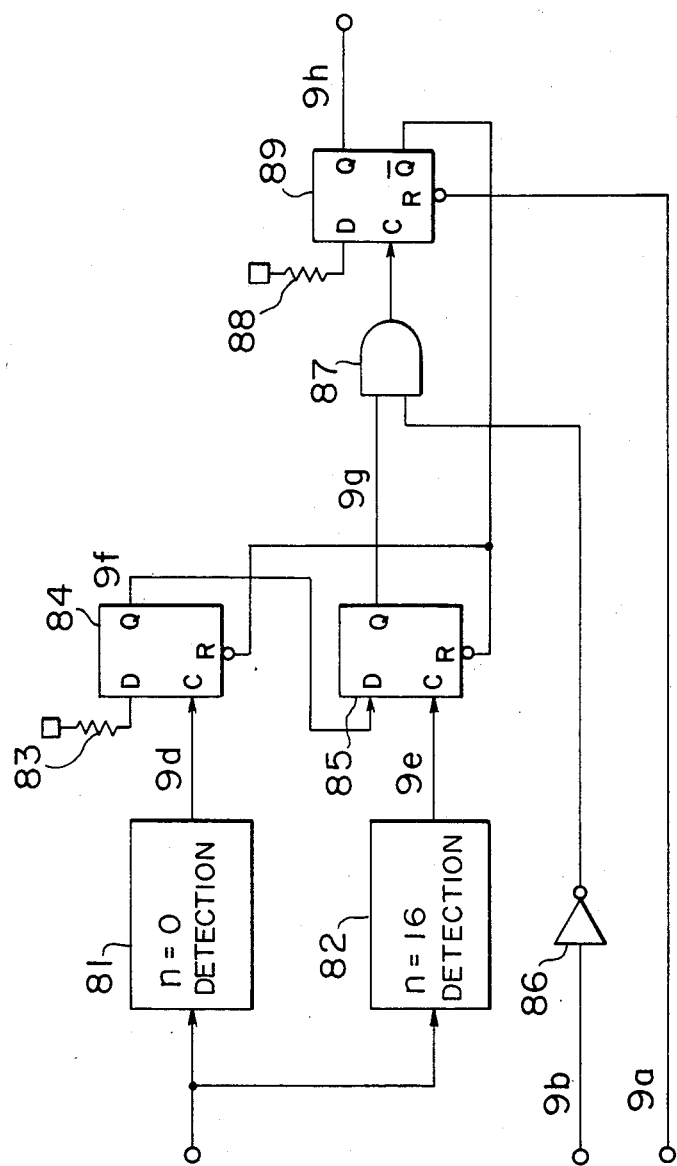
FIG. 8 is a block diagram showing an example of a circuit for use as a phase detecting circuit.
Figure 9:
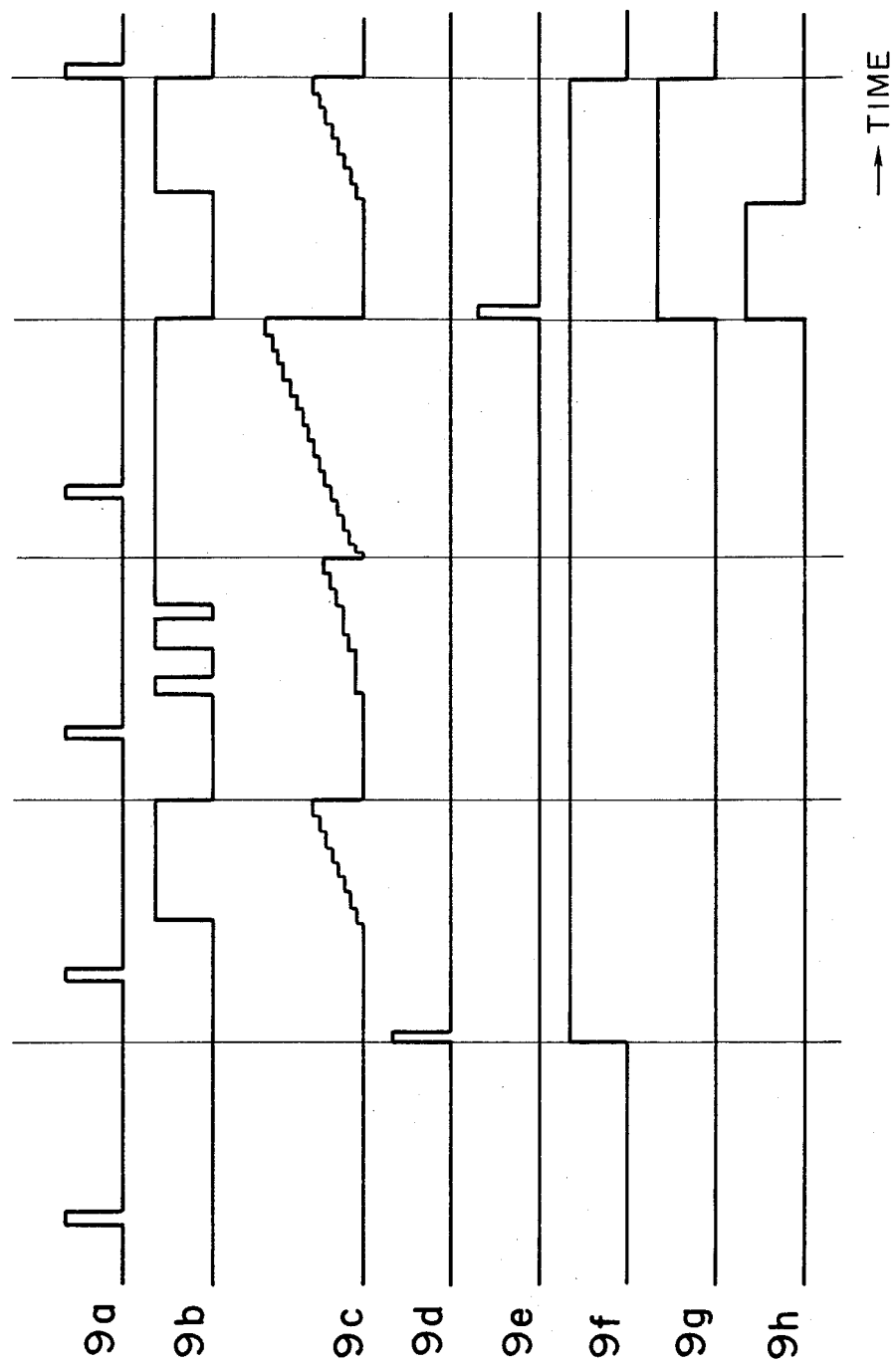
FIG. 9 is a waveform diagram for components in FIG. 8.

FIG. 8 shows an example of the phase detection circuit 67. FIG. 9 shows a waveform in each section of the circuit of FIG. 8. An n=0 detection circuit 81 detects that the output of the counter 64 in FIG. 6 is 0 and outputs a pulse 9d. The n=0 detection circuit 81 detects that the output of the flip-flop 63 is continuously at the "L" level at least sixteen times of the period of $f_b$. When this state is detected, a flip-flop 84 is set. After flip-flop 84 is set, it is detected by an n=16 detection circuit 82 that the output of the flip-flop 63 is continuously at the "H" level at least sixteen times of the period of $f_b$. When this state is detected, a flip-flop 85 is set. Reference numeral 83 denotes a pull-up resistor. Thus, a gate circuit 87 is made operative and the output of the flip-flop 63 in input to a flip-flop 89. The flip-flop 89 is set in response to the trailing edge of the output of the flip-flop 63. Reference numeral 88 denotes a pull-up resistor. A variable frequency divider 60 is reset by the output of the flip-flop 89 through the synchronizing protection circuit 69 in FIG. 6. Thus, although a phase deviation as shown in a waveform 9a occurred at first, this phase deviation is corrected and the data clock of the correct phase is output as an output pulse from the variable frequency divider 60. As described above, the phase which has once been detected is locked by controlling the variable frequency divider 60 on the basis of the result of the phase comparison by the phase comparator 68 between the FSK signal and the output pulse 9a of the variable frequency divider 60.

The case where the frequencies which are sixteen and seventeen times as high as that of the data signal are switched has been described in the foregoing embodiment. However, the method of the invention can be also applied to the case where other frequencies are used.

The case where the sampling clock frequency $f_b$ was converted to a high frequency has been described in the foregoing embodiment. However, the invention can be also applied to the opposite case where the sampling clock frequency is converted to a low frequency. In this case, the leading edge after the change from n=0 to n=16 may be used. On the other hand, the change from n=16 to n=0 can also be used.

Further, by checking the change in output of the flip-flop 63, it is possible to determine whether the sampling clock frequency has been converted to a high frequency or a low frequency. Therefore, by switching the phase detection by use of this method, an arbitrary sampling clock can be used.

In the foregoing embodiment, the sampling clocks of with two phases having a phase difference of $\pi/2$ have been formed by use of the oscillator with an oscillating frequency of $2f_b$. However, these sampling clocks can be also formed by use of an oscillator of the frequency of $f_b$ and a fixed delay circuit. This is because there is no need to accurately set the phase difference between two sampling clocks to $\pi/2$.

In the foregoing embodiment, the discriminating ranges of the "mark" and "space" have been set to the range of 4 to 12 and the range of 0 to 4 or 12 to 16, respectively. Even if these ranges are slightly changed, the influence on the resetting operation is small. These ranges can be also changed to simplify the circuit construction.

I claim:

1. A circuit for demodulating a data signal from an FSK signal comprising:
    means for converting an input FSK signal into an FSK pulse signal having a mark signal frequency and a space signal frequency;
    means for generating a clock signal of a frequency substantially equal to an integral multiple of one of the mark signal frequency and the space signal frequency;
    means for sampling the FSK pulse signal at intervals determined by the clock signal;
    means for extracting a data clock timing signal from the FSK pulse signal; and
    means for providing a data signal by converting the sampled signal to a binary signal on the basis of the data clock timing signal.

2. A demodulating circuit according to claim 1, wherein said sampling means includes:
    a first frequency divider for frequency dividing the clock signal to provide a first frequency divided signal having a frequency one-half the frequency of the clock signal;
    a second frequency divider for inverting the clock signal and frequency dividing the inverted clock signal to provide a second frequency divided signal having a frequency one-half the frequency of the inverted clock signal;
    a first flip-flop which receives the FSK pulse signal as a signal input and the first frequency divided signal as a clock input; and
    a second flip-flop which receives the FSK pulse signal as a signal input and the second frequency divided signal as a clock input.

3. A demodulating circuit according to claim 1, wherein said means for extracting the data clock timing signal includes:
    a digital phase locked loop circuit which receives as inputs the FSK pulse signal, the clock signal, and the sampled signal and provides as an output the data clock timing signal; and
    a phase detection circuit which receives the data clock timing signal and controls said digital phase locked loop.

4. A demodulating circuit according to claim 2, wherein said means for providing the data signal includes:
    a first counter responsive to the data clock timing signal for counting the output pulses of said first flip-flop;

a second counter responsive to the data clock timing signal for counting the output pulses of said second flip-flop;

a first decision circuit responsive to the count in said first counter for discriminating a mark or a space in the FSK signal;

a second decision circuit responsive to the count in said second counter for discriminating a mark or a space in the FSK signal; and a coincidence circuit responsive to coincidence of the outputs of said first and second decision circuits for providing the data signal.

5. A method of demodulating a data signal from an FSK signal comprising the steps of:

converting the input FSK signal into an FSK pulse signal having a mark signal frequency and a space signal frequency;

sampling the FSK pulse signal at intervals determined by a clock signal of a frequency substantially equal to an integral multiple of one of the mark signal frequency and the space signal frequency;

extracting a data clock timing signal from the FSK pulse signal; and converting the sampled signal to a binary signal on the basis of the data clock timing signal.

* * * * *